(12) United States Patent
Roadifer et al.

(10) Patent No.: US 6,430,277 B1
(45) Date of Patent: Aug. 6, 2002

(54) DIAL-AROUND COMPENSATION METHOD AND SYSTEM

(76) Inventors: Rodney L. Roadifer, 25819 NE. 25th St., Redmond, WA (US) 98053; Charles Z. Greene, 110 10th Ave. South, Kirkland, WA (US) 98033

( * ) Notice: Subject to any disclaimer, the term of this patent is extended or adjusted under 35 U.S.C. 154(b) by 0 days.

(21) Appl. No.: 10/081,625

(22) Filed: Feb. 20, 2002

Related U.S. Application Data

(63) Continuation of application No. 09/412,700, filed on Oct. 5, 1999.

(51) Int. Cl.⁷ .................................................. H04M 1/56
(52) U.S. Cl. ............................. 379/127.02; 379/114.01
(58) Field of Search ........................ 379/114.01, 114.03, 379/114.05, 114.15, 114.24, 114.25, 114.19, 115.01, 115.02, 116, 123, 130, 146, 149, 153, 155, 127.02

(56) References Cited

U.S. PATENT DOCUMENTS

| | | | | |
|---|---|---|---|---|
| 4,935,956 A | * | 6/1990 | Hellwarth et al. | 379/112 |
| 5,850,432 A | * | 12/1998 | Desai et al. | 379/115 |
| 6,137,874 A | * | 10/2000 | Brown et al. | 379/220 |
| 6,222,912 B1 | * | 4/2001 | Breuer | 379/114 |

* cited by examiner

*Primary Examiner*—Binh Tieu
(74) *Attorney, Agent, or Firm*—Law Offices of Albert S. Michalik, PLLC

(57) ABSTRACT

A method and system for determining dial-around compensation based on the actual data recorded at the smart pay telephones. Records maintained at the smart phone store dialed information, and, through a series of parsing and filtering operations on those records, along with database accesses based thereon, the Carrier Identification Code (CIC) associated with that call is determined. The CIC is based on the pay telephone's ANI-related information and the date and destination of the call. Once the CIC is known, another database is accessed to determine the known owner of that CIC. Output such as billing information may then be generated to collect compensation from the owner.

39 Claims, 16 Drawing Sheets

| Vendor ID From | Group | Vendor ID To |
|---|---|---|
| | ⋮ | |
| 30001 | 00001 | 30002 |
| 30001 | 00002 | 30003 |
| | ⋮ | |

*FIG. 5*

| Destination | Rate Center | LATA | State | Date | CIC |
|---|---|---|---|---|---|
| (xxx) xxx-xxxx | Cypress | xxxx | CA | 9/4/99 | xxxx |
| ⋮ | ⋮ | ⋮ | ⋮ | ⋮ | ⋮ |
| ⋮ | ⋮ | ⋮ | ⋮ | ⋮ | ⋮ |

*FIG. 8*

DIAL-AROUND COMPENSATION METHOD AND SYSTEM

CROSS-REFERENCE TO RELATED APPLICATIONS

This application is a continuation of U.S. patent application Ser. No. 09/412,700, filed Oct. 5, 1999.

FIELD OF THE INVENTION

The present invention is generally directed to computer systems and smart pay telephone systems, and more particularly to a method of computerized collection for smart pay telephone usage.

BACKGROUND OF THE INVENTION

When a smart pay telephone is used to call a "Dial Around" toll free number, which "Dials-Around" or connects to a Telecommunication Carrier subscribed to by the owner of the smart pay telephone, through the use of (but not limited to) an "800," "877" or "888" number, the Federal Communications Commission requires that the owner of the number compensate the owner of the pay telephone for any completed call. At present, the amount of compensation, known as "dial-around compensation" is twenty-four cents per call. As can be appreciated, this can add up to a sizeable amount of money since smart pay telephones often dial "Dial Around" toll free numbers, resulting in "Dial Around" (e.g., when callers use a calling card or subscriber 800 number), and an entity may own many smart pay telephones.

Presently, the only way that the owners of the smart pay telephones can get compensated for such calls is to deal with a clearinghouse which processes compensation payments for one or more InterExchange Carriers (IXCs), or directly from the responsible IXC owning such "Dial Around" toll free numbers. Essentially, the smart pay telephone operator registers each smart pay telephone number (ANI) with one or more clearinghouses and/or IXCs, and receives a check from the clearinghouses and/or IXCs for the Dial Around calls completed using the IXC's "Dial-Around" numbers made from the owner's phones (ANIs).

One significant problem with this scheme is that the owner of the private pay telephone has no way to know what "Dial Around" numbers are assigned to each IXC. Thus it is presently not possible to reconcile amounts received from the clearinghouse(s) and/or IXCs with the call records collected at the smart pay telephone. The private pay telephone owner/operator is essentially at the mercy of the clearinghouses and/or IXCs, and/or the owner of the switch where the calls are logged. As a result, the smart pay telephone owner has no way to verify that the compensation is in the correct amount. Similarly, switchless resellers of "Dial Around" toll free numbers have no way of knowing whether they have been properly billed. Moreover, with the present scheme, because the owners of Dial Around toll free numbers are generally switched-based carriers, they are in control of all the information (SMDR Records) used or provided to the clearinghouses for determining compensation amounts. Such carriers are thus effectively billing themselves, with little or no oversight. As a result, the owners of the smart pay telephone systems are not particularly satisfied with the present dial-around compensation system, nor are the switchless resellers. Nevertheless, no alternate compensation mechanism or way to reconcile the compensation has been heretofore available.

SUMMARY OF THE INVENTION

Briefly, the present invention provides a method and system for determining dial-around compensation based on the actual data recorded at the smart pay telephones. To this end, records maintained at the smart phone, store dialed information. Through a series of parsing and filtering operations on those records, and database accesses based on information in the records, the present invention establishes which Carrier Identification Code (CIC) is associated with each call, based on the pay telephone's ANI-related information and the date and destination of the call. Once the CIC is known, another database is accessed to determine the known owner of that CIC. Output such as billing information may then be generated to collect compensation from the responsible IXC or reconcile IXC payments.

Other advantages will become apparent from the following detailed description when taken in conjunction with the drawings, in which:

BRIEF DESCRIPTION OF THE DRAWINGS

FIG. 5 is a general representation of a file specifying how records are to be grouped in accordance with one aspect of the present invention;

FIG. 8 is a general representation a file specifying how information is maintained in a master carrier information code database in accordance with one aspect of the present invention;

DETAILED DESCRIPTION OF THE PREFERRED EMBODIMENT

The present invention is directed to dial-around compensation, wherein smart pay telephone vendors bill the owners of toll-free "Dial Around" numbers (e.g., "800" numbers and the like) to recover compensation (per FCC rules) for calls made from the private pay telephone vendors' smart pay telephones. In general, smart pay telephones store information about calls made therefrom in a memory within the smart pay telephone. The information, in the form of records, ordinarily is regularly downloaded to another computer to avoid overflowing the smart pay telephone's memory.

Once the records are downloaded, they are processed in accordance with one aspect of the present invention, whereby bills are generated for billing the owners of the Dial Around toll free numbers, or reports for reconciling payments therefrom. As described herein, the records are sent (e.g., further downloaded) to another computer for this processing. As can be readily appreciated, however, some or all of the processing may take place on the computer to which the information was initially downloaded, and indeed, still other computers (e.g., servers) may perform part of the processing. In any event, as will be understood, the processing generates the appropriate bills to ensure highly accurate and reconcilable compensation for dial-around calls.

Figure 1:
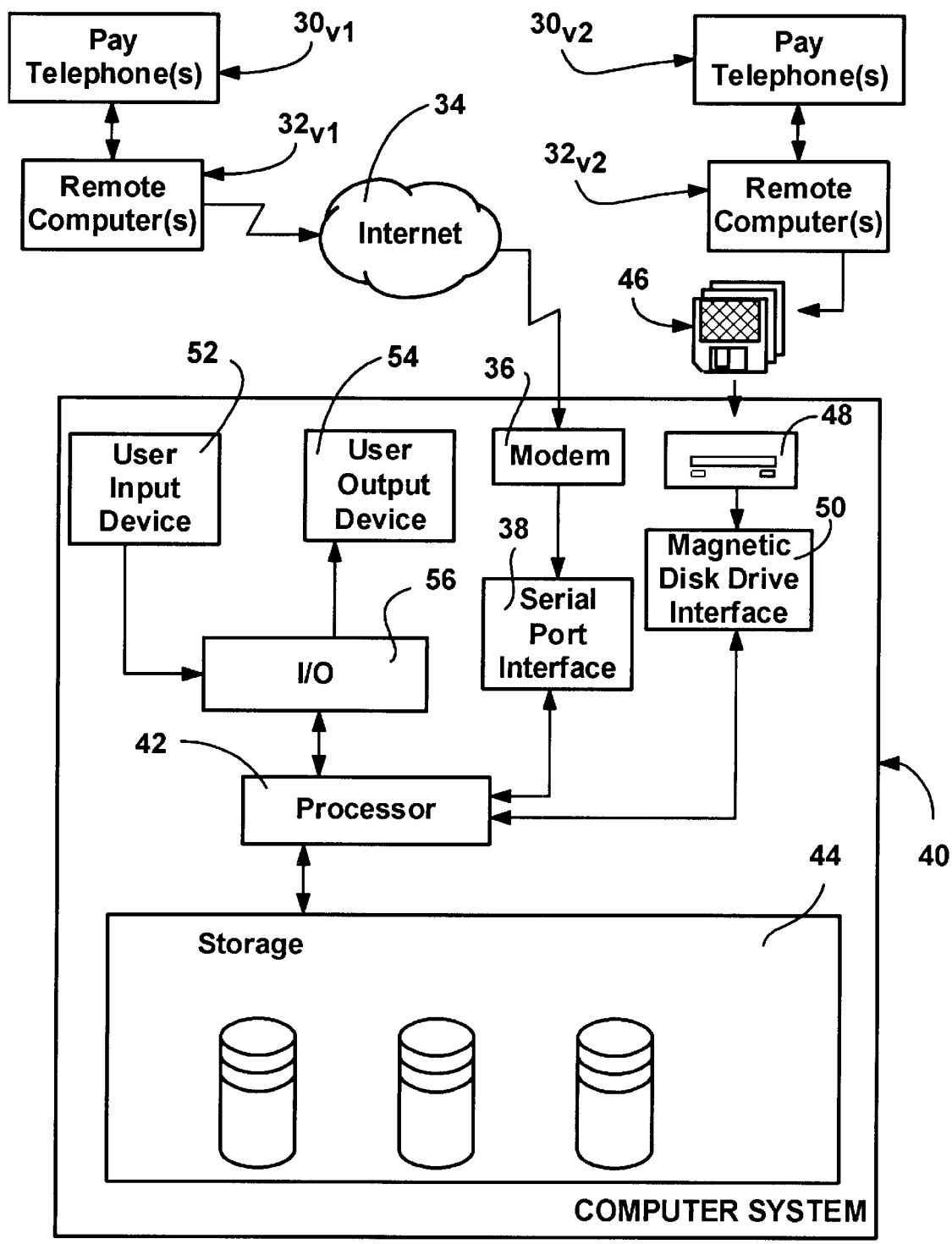
FIG. 1 is a block diagram representing a computer system into which the present invention may be incorporated.

Turning to the drawings with particular reference to FIG. 1, two sets of smart pay telephones $30_{v1}$ and $30_{v2}$ are shown, such as from two different private pay telephone vendors. As described in more detail below, each of the smart pay telephones, e.g., $30_{v1}$, maintains records of each call made therefrom. The records may be downloaded to a computer $32_{v1}$ of the private pay telephone vendor, and transmitted via the Internet 34 to a modem 36 or the like and a serial port interface 38 to another computer system 40. A processor 42 of the computer system 40 stores the records in a storage 44, which may be one or a combination of volatile (e.g., RAM) and non-volatile (e.g., hard disk) memory. Other records, such as from the smart pay telephones $30_{v2}$ and remote computers $32_{v2}$ may be stored on one or more floppy disks 46. The disk or disks 46 may be sent (e.g., mailed) to an operator of the computer system 40, and read via a magnetic disk drive 48 and magnetic disk drive interface 50 for processing. The computer system 40 typically also includes a user input device 52 and user output device 54 connected to the processor 42 through a suitable input/output mechanism (I/O) 56.

Figure 2:
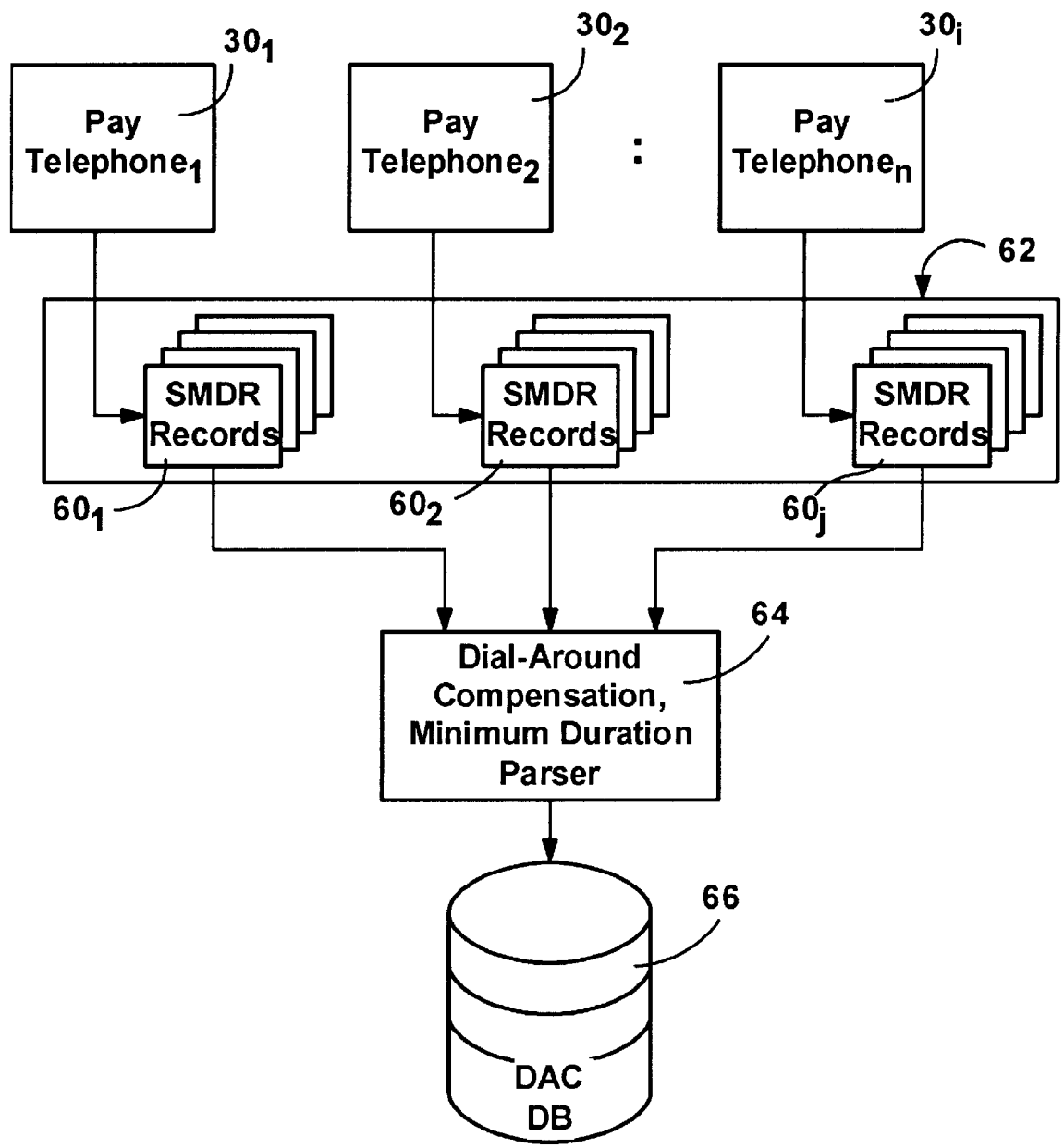
FIG. 2 is a block diagram representing how telephone records are parsed to obtain records suitable for dial-around compensation (DAC) in accordance with one aspect of the present invention.

As shown in FIG. 2, each smart pay telephone $30_1$–$30_i$ provides a plurality of records, known as Simple Message Data Record (SMDR) records $60_1$–$60_j$. Each record represents the information about a telephone call. The records from one private pay telephone vendor are generally combined into a single text file 62, with various comma-delimited fields and generally but not limited to a carriage-return, line-feed "<CR><LF>" between records. Some way of differentiating the end of a record from the start of the next is provided, e.g., a single <CR>, <LF>, or even possibly by a fixed length per record if such a format was employed.

Figure 3:
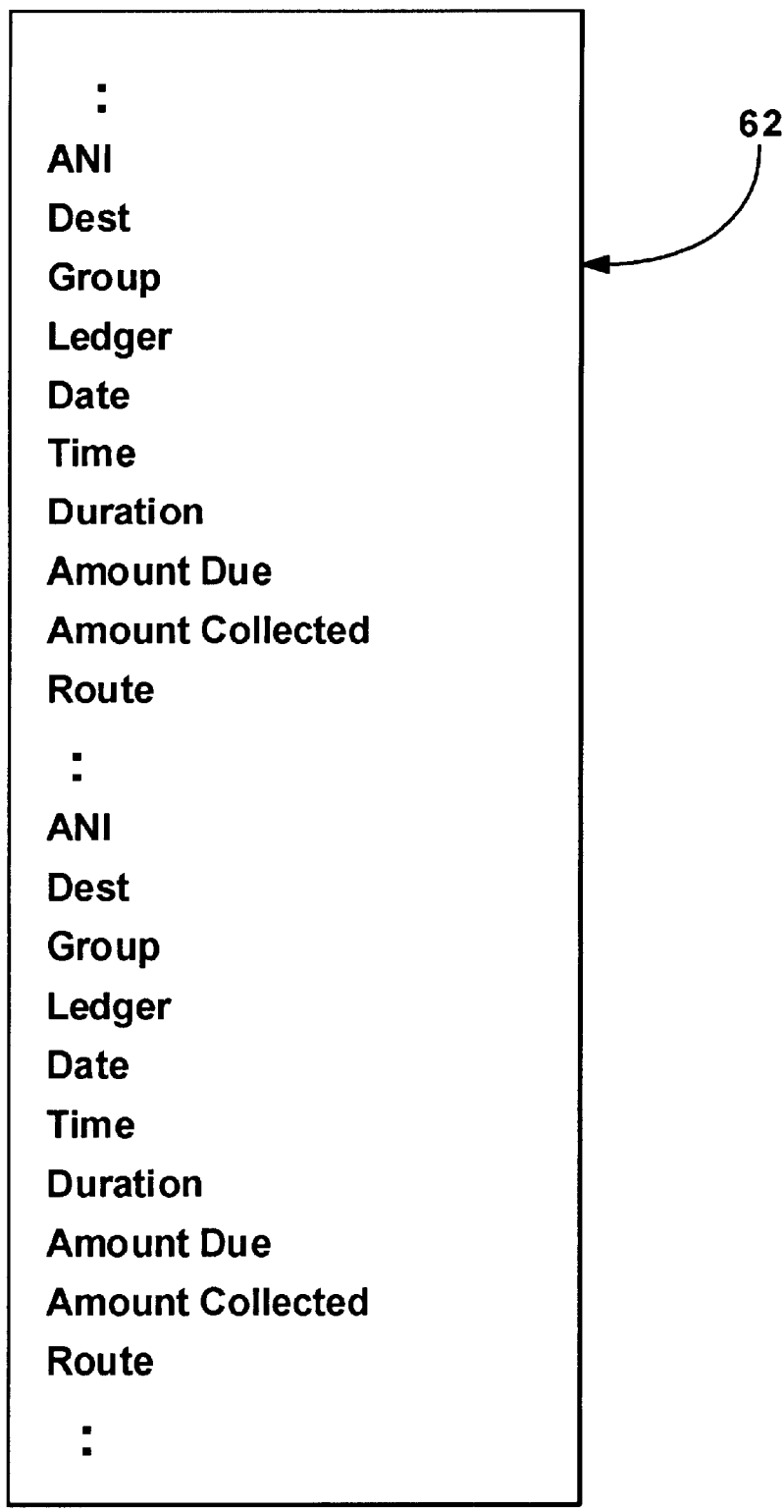
FIG. 3 is a general representation of a file of SMDR records.

FIG. 3 generally shows various fields of such records according to one such format, labeled with their general names and separated vertically in FIG. 3 (instead of comma-delimited) for purposes of readability. Note that other formats and/or fields are possible. The ANI field is the ten digit telephone number of the smart pay telephone, NPA (area code), NXX (prefix) and station code. The Destination field records the telephone number that was called and thereby produced this record. The Group and Ledger fields as well as the routing information are programmed by the private pay telephone vendor as desired. For example, a private pay telephone vendor may have all of the telephones in one geographic area arranged in one group, and another geographic area arranged in another group. The Date and Time fields record when the call was made, and the Duration field records the length of the call. The Amount Due and Amount Collected fields store how much the call cost and how much was collected from the user, while the Route field stores information as to what route was actually used to connect the call. Routing information includes to which Telecommunications Carrier the call was connected, and, with additional filtering applied, which called-to-number is passed to the Carrier's switch, which, as described below, may not be the same as what the user dialed.

As shown in FIG. 2, a parser 64 is provided to filter out calls that are not calls to which the private pay telephone vendor is entitled to dial-around compensation. To this end, the parser 64 reads each of the records, and maintains in a dial-around compensation (DAC) database 66 only those calls that are to Dial Around toll free numbers of a certain minimum duration. At present, the parser 64 adds calls that were dialed to "800," "877," "888," "950," or "1010" numbers, and that had at least a twenty second duration. As can be readily appreciated, other numbers may be added. Twenty seconds was chosen because it corresponds to a very-high likelihood that the call was completed as needed for compensation, i.e., calls of a lesser duration may have been wrong numbers, not connected and so forth. Note that some other minimum duration may be selected, such as one statistically proven to be even more indicative of a completed call. In any event, when the parser 64 has gone through the records, the DAC database 66 stores only those records for the calls to which the pay telephone vendor may be entitled to compensation. Note that such pre-filtering may be performed by a computer of the pay telephone vendor, or even the smart pay telephone itself.

Figure 4:
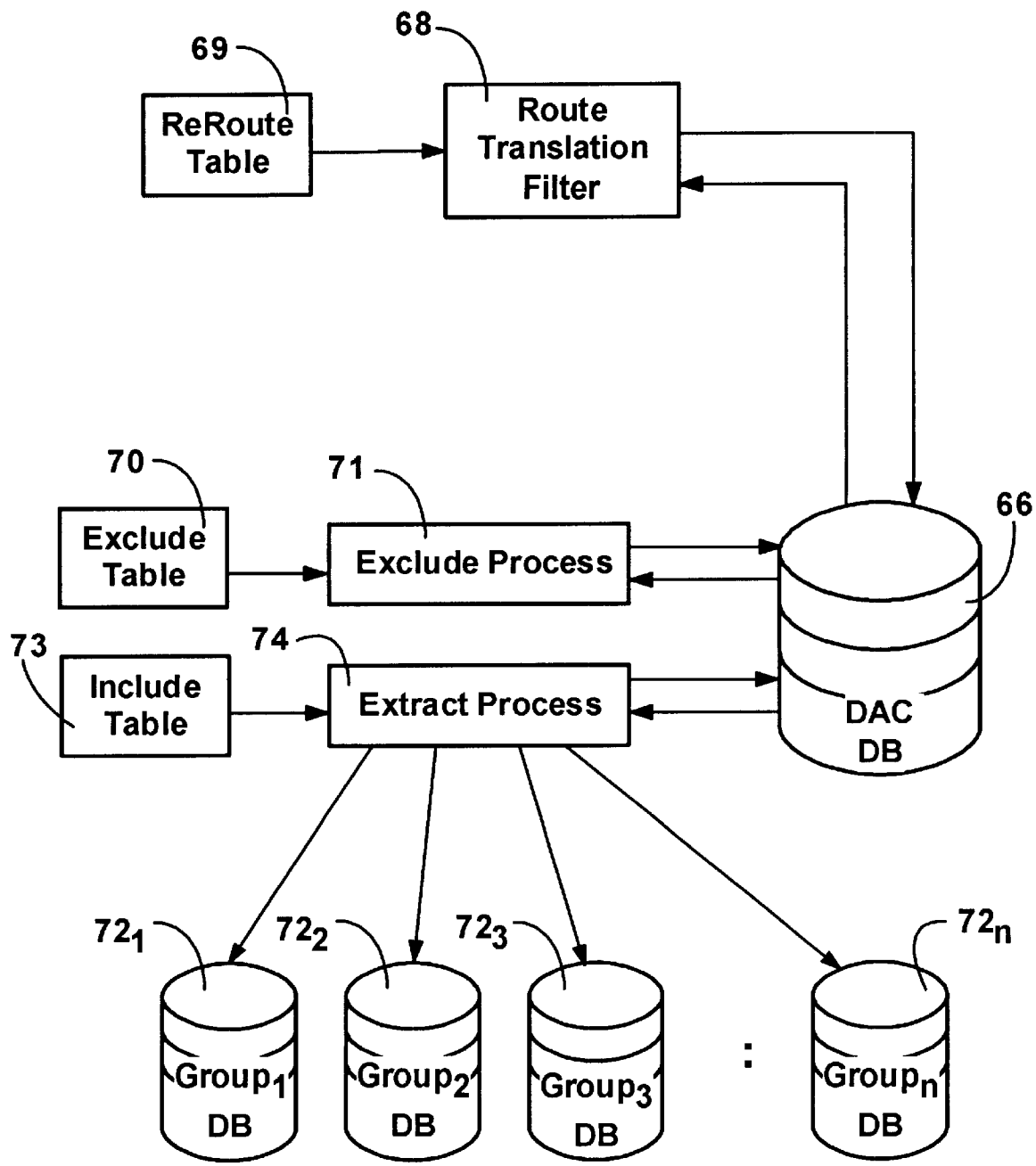
FIG. 4 is a block diagram representing various components and the separation of DAC records into groups of records in accordance with one aspect of the present invention.

As shown in FIG. 4, certain other records may be removed, in particular, those which are improperly translated. In general, "translation" refers to pulsing out a number other than that dialed by a pay telephone end-user. Many times translation is legal. However, many times translation is illegal, for example, if overriding a long distance carrier (IXC's) specifically chosen by a pay telephone end-user. When translation is detected by a filter 68 via the route field, the translation is examined against a reroute table 69 to determine if it is a known legal translation. If not known to be legal, that record is deleted since it is currently illegal (as regulated by the FCC) to pulse out a destination number that results in connection to a long distance carrier different from the end-user's choice. In one implementation, the route translation filter 68 comprises a simple SQL statement that deletes invalid records based on the information in the ReRoute table 69. The SQL statements described herein are all straightforward to implement for those skilled in the art, and thus are only generally described in terms of their functions. Note that the smart pay telephone vendor programs the translation, and thus this filtering may be omitted for reputable private pay telephone vendors that do not illegally translate. Such private pay telephone vendors may also provide information as to which numbers are being legally translated, along with the translation route, e.g., 1-800 888-8000 is the standard MCI access number for placing a long distance card call. If this number is entered at the keypad by an end-user, "translation" can be programmed into the Smart pay telephone to access the MCI switch using the MCI "Dial Around" toll free number 1010222 instead of via the 800 number entered. Again, the ReRoute filter 68 comprises a SQL statement to handle replacing the destination field with the translated number.

Certain groups (or even certain ANIs) may be excluded, as specified in an exclude table 70. For example, a private pay telephone vendor may have several telephones that are used for testing purposes. A process 71 (comprising a SQL delete statement) may apply the entries in the exclude table 70 to delete certain groups of records from the DAC database 66. Note that records recording calls to certain destinations may be excluded, e.g., a large private pay telephone vendor may have a contract with a large toll free provider that pays the private pay telephone vendor a flat rate rather than on a per call compensation basis, whereby calls to those particular destination numbers can be excluded.

As also shown in FIG. 4, certain private pay telephone vendors want their SMDR records separated by groups. For example, a large private pay telephone vendor may have separate entities with which it contracts to handle the smart pay telephones of those separate entities, e.g., maintain, collect the coins therefrom, and even download the SMDR records. Such a private pay telephone vendor would likely want the SMDR records to be classified according to which entity owns the smart pay telephone. Private pay telephone vendors also contract with businesses so as to install their telephones on the premises of a business, e.g., at an airport or a hotel, whereby it may be desirable to logically separate those telephones from others. Still other private pay telephone vendors may desire that the telephones of one geographic area be separate from those of another. As described above, the record's group field (or equivalent) makes it possible to later separate a block of records by group according to the private pay telephone vendor's desired group criteria.

As shown in FIG. 4, separate group databases $72_1$–$72_n$ may be provided. To this end, an include table 73 instructs an extract process 74 (comprising a SQL statement) as to how records that are extracted from the DAC database 66 are to be grouped for billing purposes. For example, as shown in FIG. 5, the include table 73 specifies that a private pay telephone vendor ID of 30001 (known by which private pay telephone vendor sent the records) includes records from private telephone vendors 30002 and 30003. Note that it is also possible to separate telephone records by other means, such as by ANI, whereby, for example, the include table 73 may list the various individual ANIs that are to be grouped together.

Further, note that often there are no distinct groups, whereby the DAC database 66 simply becomes the group database (appropriately renamed if necessary). In any event, as shown in FIG. 4, multiple group databases $72_1$–$72_n$ are constructed by extracting records by group from the DAC database 66 via a SQL statement that adds selected information in the records to the appropriate group database. Note that a separate process (e.g., using SQL Make Table queries, not shown) may be used to create a group database for each distinct group in the include table 73 if one does not already exist for that group.

To keep the various group databases straight, each database is uniquely named by the "Vendor ID To" number in the include table 73 (FIG. 5), along with a time stamp of year and quarter, i.e., VendorIDTo_yyyyQ where yyyy is the year and Q is the quarter. Note that quarters have been selected for convenience and to keep the size of the databases manageable, however as can be understood, a database may store records daily, weekly, monthly, yearly or virtually any other time period that is practical, or even by some other means such as number of records, memory used and so forth. A preferred "Vendor ID To" value is a number assigned to the private pay telephone vendor by the National Payphone Clearinghouse for each group the private pay telephone vendor registers, and is thus unique. This current numbering scheme is based on the National Payphone Clearinghouse unique numbering scheme but can be based on any unique numbering scheme.

Figure 6:
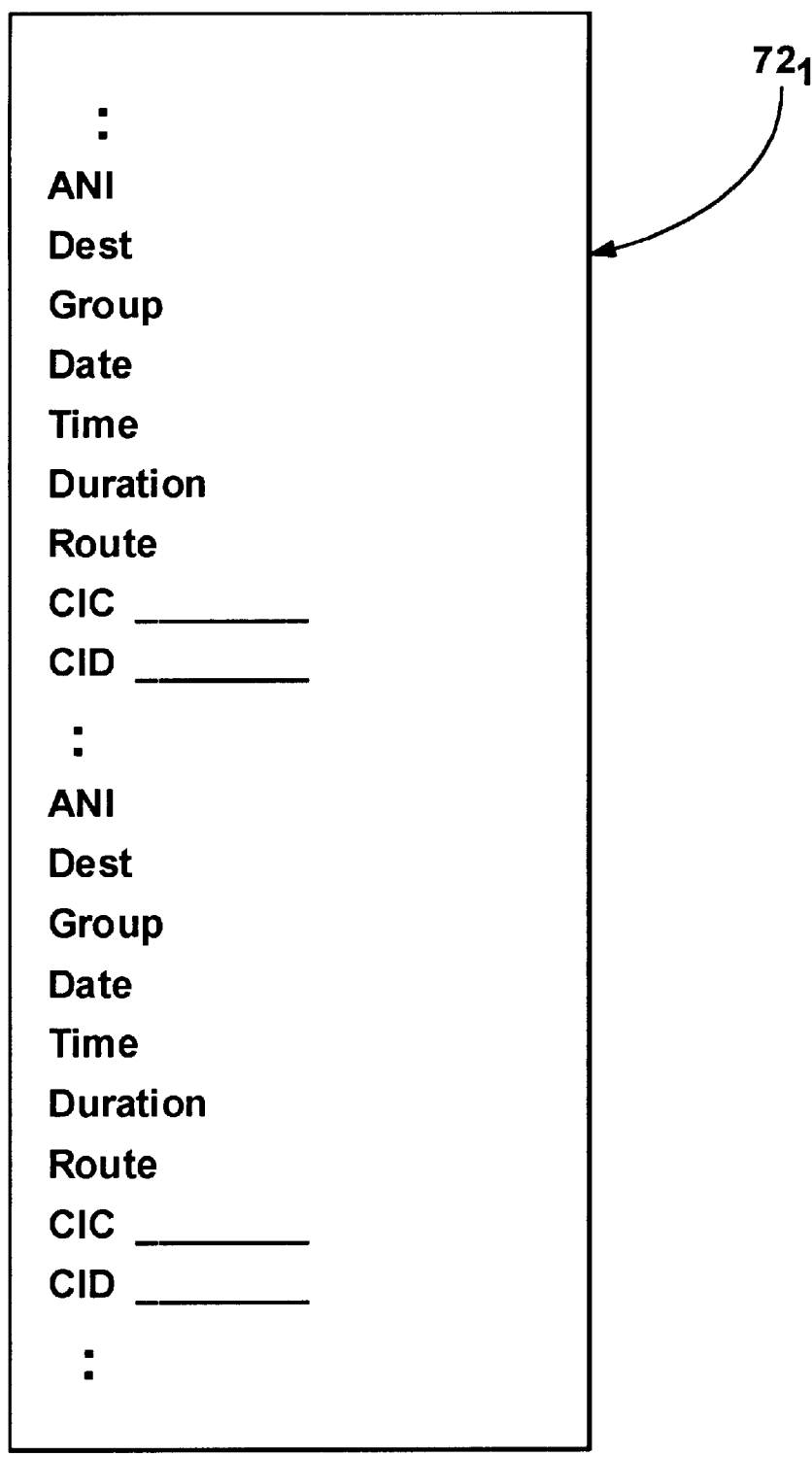
FIG. 6 is a general representation of data structures in a database for determining dial-around compensation for calls in accordance with one aspect of the present invention.

In accordance with one aspect of the present invention and as represented in FIG. 6, in addition to the selected information from the SMDR records, the DAC database 66 and thus each group database (e.g., $72_1$) extracted therefrom includes two fields, one field for a four-digit carrier identification code (CIC) and one for carrier identity (CID). At this time, the CIC and CID fields are presently unknown and are empty fields in each record in the group databases. In general, a CIC is registered to the owner of the Dial Around toll free number, while a CID will be used to represent a company such as a large telephone company that may own many CICs.

In accordance with another aspect of the present invention, the values for the CIC fields are determined by CIC locator process 80 for each record in each group database. As will be understood, this is a complex process because the carrier of a Dial Around toll free number may be different depending on when a call was made and from where the call was made. While large companies tend to keep their Dial Around toll free numbers somewhat constant, small companies and individuals may change their Dial Around toll free numbers regularly. Moreover, Dial Around toll free numbers may be geographically limited. For example an entity may desire to accept calls generated by end-users calling via their 800 toll free number from within the state only.

Figure 7:
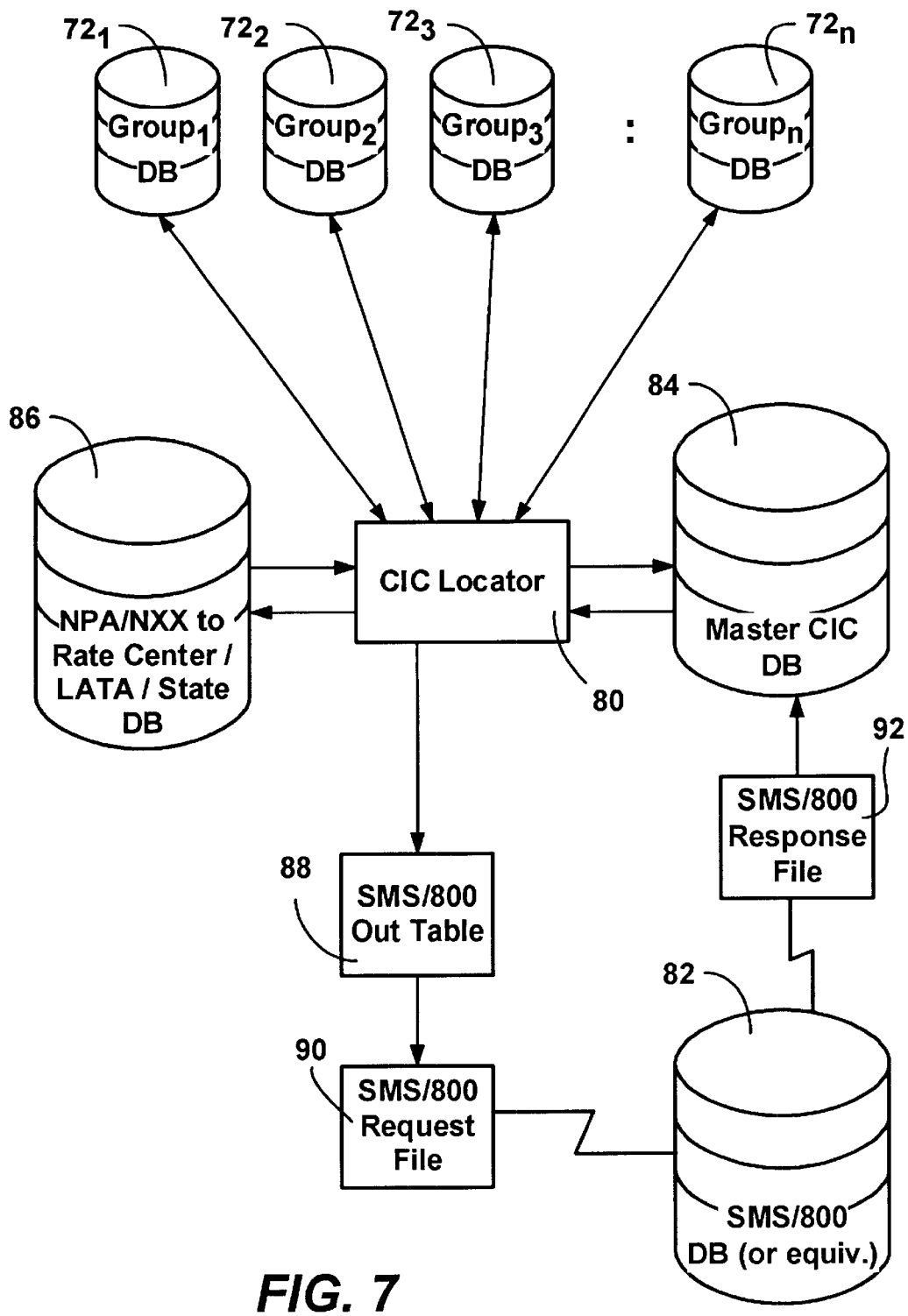
FIG. 7 is a block diagram representing various components for obtaining the carrier identification codes (CICs) corresponding to CIC fields in the data structures of FIG. 6 in accordance with one aspect of the present invention.

The CIC codes for DAC numbers are maintained in a fee accessible, telecommunications naming service database, referred to as a SMS/800 database 82 (FIG. 7). For example, one way to access the SMS/800 database 82 is via a fee-based service provided by Transaction Network Services (TNS). However, each record for which CIC information is desired costs a tariffed amount, or fee. Thus, accessing the SMS/800 database each and every time to determine each CIC code is cost-prohibitive when dealing with many thousands of records.

In accordance with another aspect of the present invention, a master CIC database 84 is maintained locally, and stores the information necessary to match a CIC to the ANI/destination stored in a record. However, rather than store a record for each destination and ANI, ANIs that share common, unique location information (Rate Center, LATA and State) are grouped together in the master CIC database 84 in a single record per destination.

As shown in FIG. 7, the Rate Center, LATA and State information for a telephone number (the NPA, NXX of an ANI) is available from a publicly (Internet) accessible (Bellcore) NPA/NXX to Rate Center, LATA and State database 86. In this manner, once it is known that any payphone in the same Rate Center, LATA and State has called a destination (Dial Around toll free number), any other payphone record with the same originating Rate Center, LATA and State (cross-referenced by NPA, NXX) that calls that same destination number will be known to have called the same owner, whereby the same CIC applies. Since ANIs may change, however, a local copy of the NPA/NXX to Rate Center/LATA/State database 86 is maintained for each month, although only one is shown in FIG. 7 for purposes of simplicity. In other words, the publicly-accessible database 86 only stores current information, however the SMDR records may be for previous months, and thus the ANI to Rate Center/LATA/State information needs to be cross-referenced with a local copy of the database maintained for the corresponding month, based on the date of the call. Note that a single NPA/NXX to Rate Center/LATA/State database 86 may be arranged with a date field (or even a date range field) such that by inputting the date as a query parameter, only one database need be cross-referenced for any given call regardless of its date.

FIG. 8 shows how the master CIC database 84 generally stores its entries, e.g., with fields for destination number, Rate Center, LATA and State information and the CIC field. In addition, as mentioned above, CICs also change ownership from time to time, and thus a field is reserved for storing the date that the entry was added to the database 84. From time to time, e.g., monthly, the master CIC database 84 is pruned of those entries that are deemed too old to be reliable, e.g., more than fourteen months old. Note that statistics may be used to analyze how often a destination/CIC relationship changes, so that frequently changing entries may be pruned more often than entries which are seemingly more static. Moreover, note that rather than prune the database, the CIC locator 80 may simply treat expired entries as not found, after which they will be updated, as described below. Also, if the SMS/800 database was free or at least less cost-prohibitive, (and sufficiently fast to access), then the master CIC database 84 need not be maintained, or if still maintained such as for speed or improved availability, may be updated very often (e.g., daily).

For the records with a destination and corresponding Rate Center, LATA and State that are not found in the master CIC database 84, (or possibly an entry is present but expired), the SMS/800 database 82 is accessed. To this end, the information needed to determine the CIC, i.e., destination, and the Rate Center, LATA and State information (located via the ANI) corresponding to those records is added to a SMS/800 out table 88. Note that the SMS/800 out table 88 enables the CIC locator process 80 to send multiple requests for information to the SMS/800 database 82 rather than access it with one request at a time. Moreover, duplicate requests are merged, whereby multiple fees are not charged for the same information.

In this manner, when the CIC locator process 80 processes the group databases $72_1$–$72_n$, the CIC locator process 80 obtains any missing CIC information by a single SMS/800 request. To this end, the CIC locator process 80 reformats the SMS/800 out table 88 into a SMS/800 request file 90 in a format needed by the SMS/800 database 82, and receives a SMS/800 response file 92 having the CIC information therein. The SMS/800 response file 92 is then read into the master CIC database 84. Note that initially, the master CIC database 84 is empty, and is built up over time via returned SMS/800 response files, such as the file 92.

Once the SMS/800 response file 92 has been read into the master CIC database 84, selected entries (e.g., "800," "877" and "888" destination numbers) in the group databases have their CIC codes filled in by the locator process 80, via the NPA/NXX database 86, master CIC database 84 and a SQL statement. Other entries, i.e., those such as 950-xxxx and 1010-xxxx have their CIC codes already in their destinations, since xxxx is the CIC code for "950" and "1010" numbers. For such entries, the CIC code portion is copied from the destination field to the CIC field, also via a SQL statement. At this time, the records in the group databases each have the CIC identifier, whereby the appropriate entity may be billed for the call.

Figure 9:
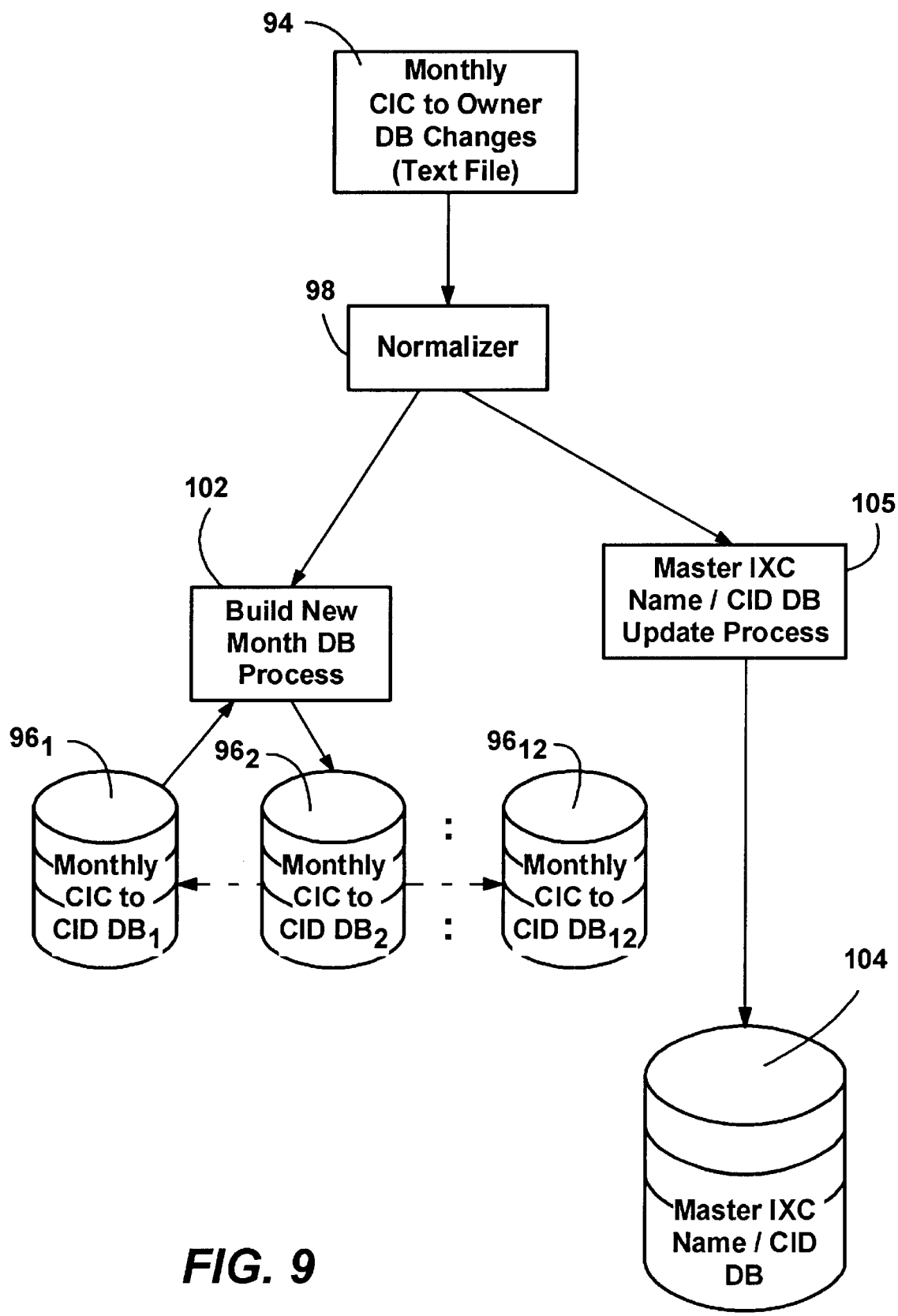
FIG. 9 is a block diagram representing various components for determining the owners of the carrier identification codes (CICs) for filling in the CID fields in the data structures of FIG. 6 in accordance with one aspect of the present invention.

FIG. 9 shows how the owners of CICs (the entities to bill) may be located based on the CIC and month of the call. As described above, the owner of a CIC code may change from time to time. The owners of CIC codes are available in a publicly (Internet) accessible file 94, a text file which is updated monthly, whereby any updates (additions, mergers, acquisitions, deletions or changes, and so forth) may be downloaded for a given month. From this information, one or more (e.g., per month) local databases (e.g., $96_1$–$96_{12}$) may be maintained to store this information, whereby the correct owner of a CIC code may be determined for a given month or other appropriate time period.

However, these updates are not uniformly entered. By way of example, for one CIC code, "XYZ Incorporated" may be entered, while for another CIC code owned by the same entity, an abbreviated "XYZ Inc." may be stored. A normalizer 98 runs through the various change data and normalizes the data according to a set of rules, e.g., all "Incorporated" entries become "Inc." entries in a normalized set of changes. The normalizer 98 may also attempt to match close entries to give a process operator the ability to overcome typographical/spelling errors present in the change information, e.g., "XYZ Telephon Co." may be matched to "XYZ Telephone Co."

Once the changes are normalized in this manner, a process 102 (which may be part of the normalizer code 98) builds a new month's CIC to CID database (e.g., $96_2$) based on the previous month's database and this month's changes (e.g., $96_1$). Any database that is too old (e.g., billings can not be collected for calls more than one year old) may be discarded. New entries, i.e., those having names that are not recognized as corresponding to a known entity are each assigned a unique carrier-identifier (CID), while existing entries are copied with their existing CIDs. Also, an IXC name to CID database 104 that maps the owning entities' billing information (name, address and so forth) to the assigned CID is updated by a process 105 (which may be part of the normalizer code 98) based on the change information. Note that as represented by the dashed line between databases in FIG. 9, alternatively, a single CIC-to-CID database may be maintained, with a date field such that a query based on CIC and date will retrieve the appropriate CID.

Figure 10:
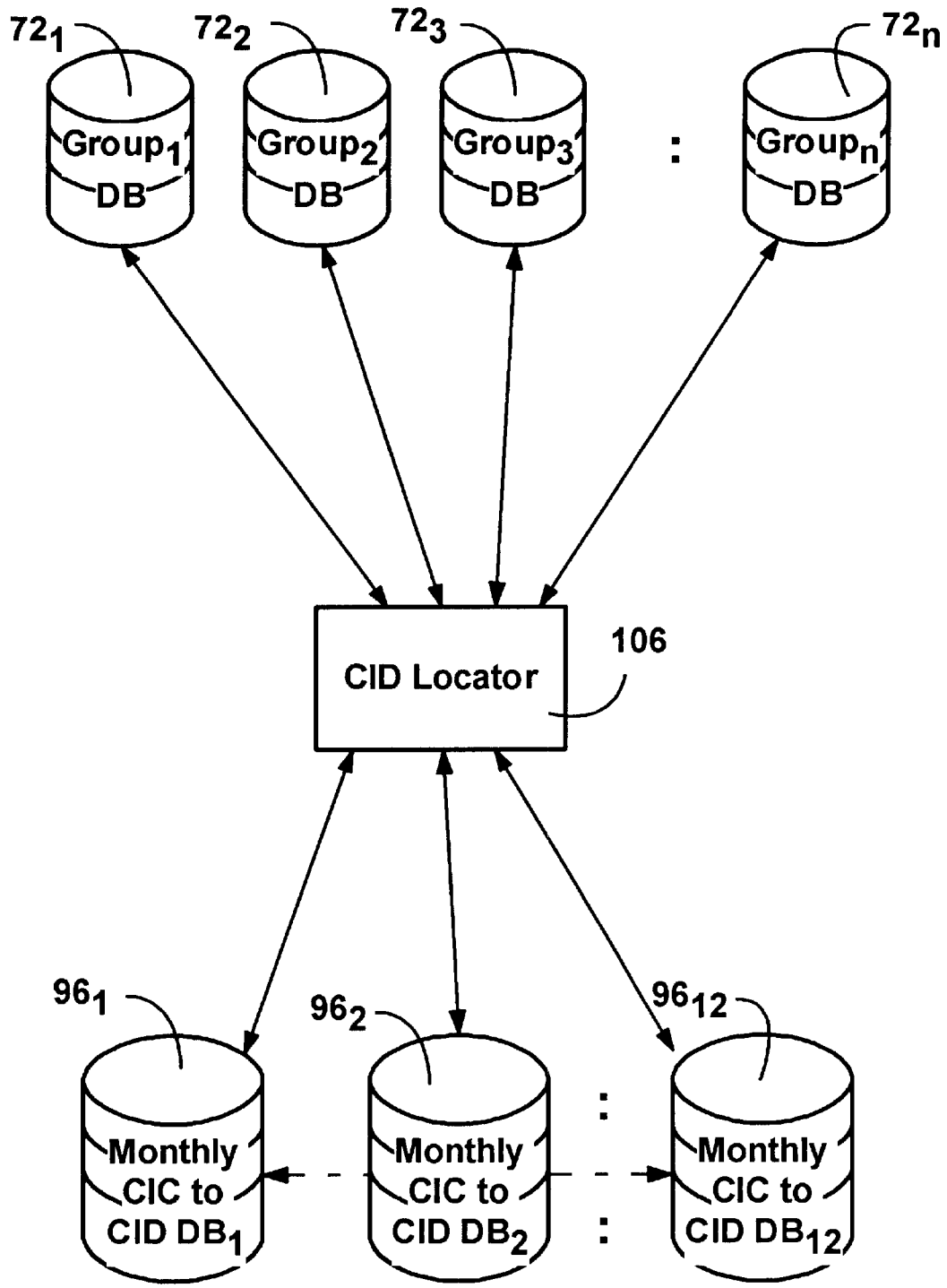
FIG. 10 is a block diagram representing various components for determining carrier identifiers (CIDs) corresponding to the CICs for filling in the CID fields in the data structures of FIG. 6 in accordance with one aspect of the present invention.

After the CIDs are updated, a CID locator process 106 (FIG. 10) comprising a SQL statement writes the corresponding CID into the currently selected group database 72, based on the CIC and date for each call made. At this time, the information needed for generating output (such as bills) is available. For example, the output may be generated per CID, with information about the calls presented in the bill. To this end, an output (bill) generator 108 (FIG. 11) sorts the entries by CID, looks up the owner in the Master IXC Name/CID database 104, and outputs information in a suitable format, e.g., as a printed bill (e.g., $110_1$) specifying the payment owed to the currently-selected group. The output may include any of the information in the $Group_1$'s database records, e.g., destination number called, where called from, time of call, duration of call and so forth to serve as proof that the call was made and compensation is due.

Figure 11:
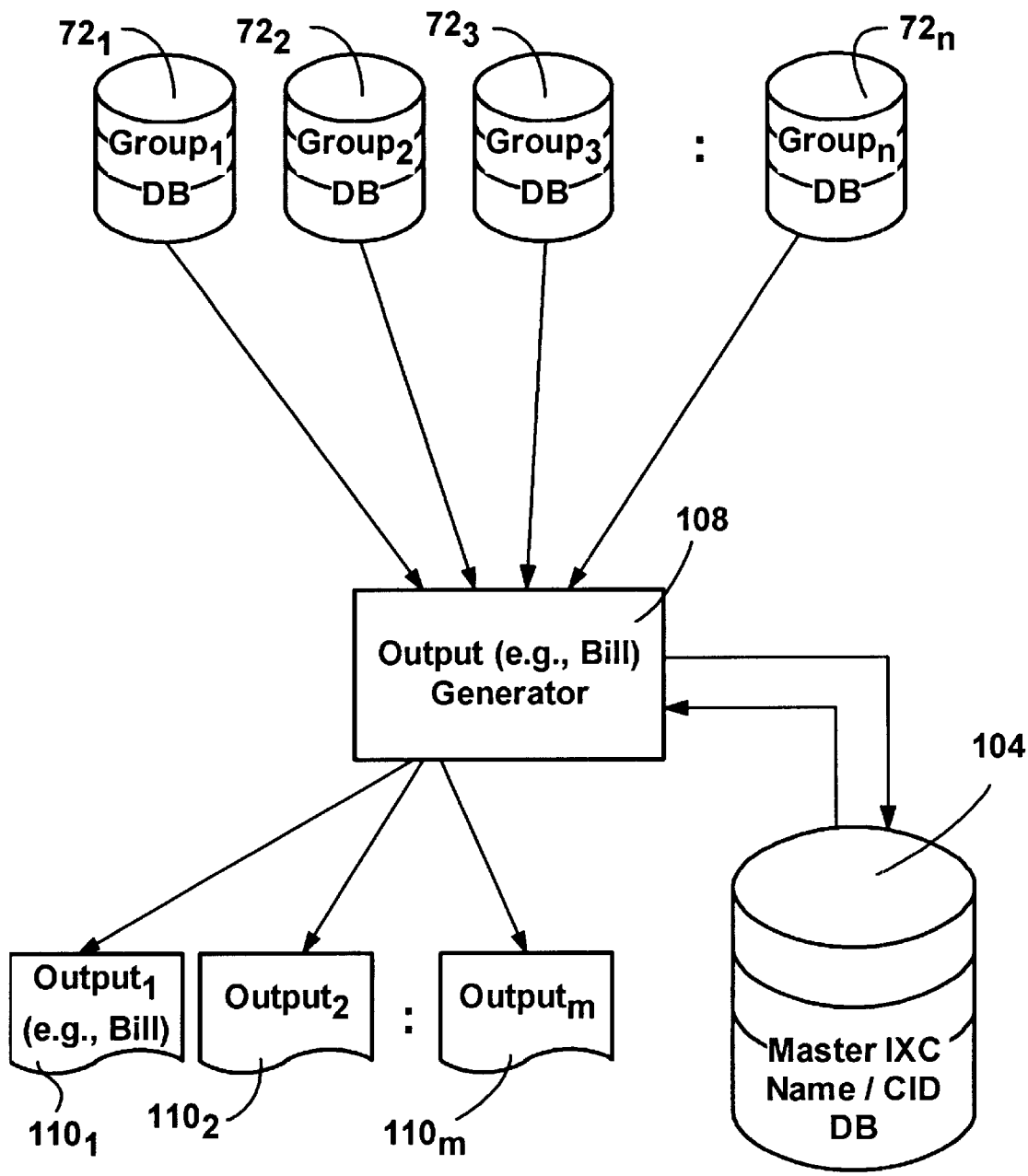
FIG. 11 is a block diagram representing various components for providing output from the group databases in accordance with one aspect of the present invention.

Thus, as generally shown in FIG. 11, whenever some output (e.g., a bill or a report) is desired, the output may be generated (e.g., printed) for the selected group. For example, this may be accomplished by sorting the records according to CID, and/or extracting the records for each distinct CID. The calls/charges are summed, presently twenty-four cents per call, and the bill printed out or otherwise prepared (e.g., e-mailed) based on the owner information corresponding to the CID. Although not shown, bills under five dollars (or some other threshold) are not generated, but rather accumulated until the threshold is met for a given CID. However, since calls that took place over one-year ago may not be charged, a bill may be generated and sent if the oldest call thereon is approaching one year in age even if the bill is not at the dollar threshold. Of course, if the postage and other costs exceed the amount to be collected, a bill may simply not be generated and the expired calls removed from the ongoing accumulated bill for a CID.

Figure 12:
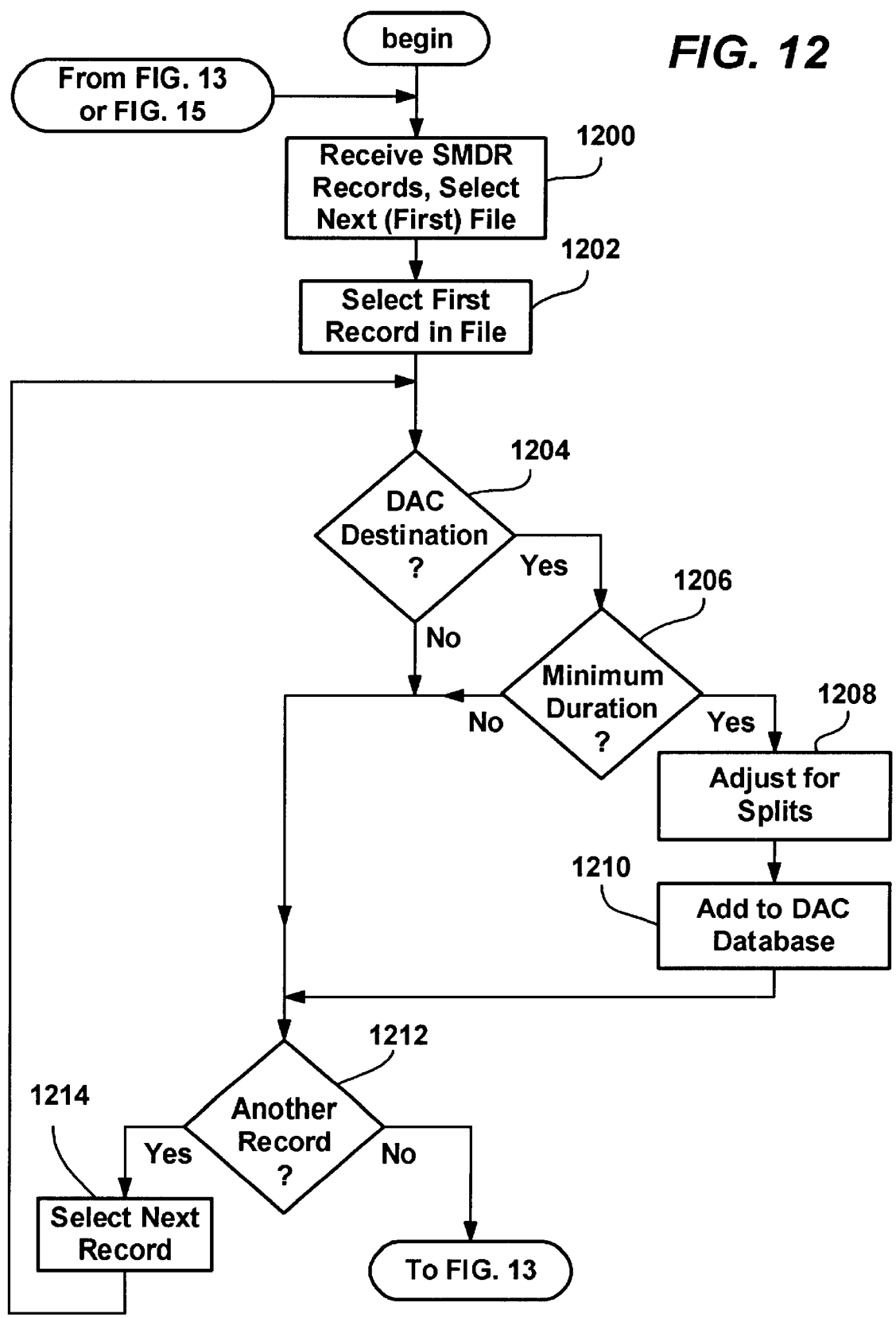
FIG. 12 is a flow diagram generally representing a process for filtering DAC records from other records in accordance with one aspect of the present invention.

Turning to an explanation of the invention with particular reference to the flow diagrams of FIGS. 12–17, and by way of summary, the process begins when one or more sets of smart pay telephone (SMDR) records $60_1$–$60_j$ are received from a private pay telephone vendor, e.g., private pay telephone vendor number 30001, as represented by step 1200 of FIG. 12. Note that the records may be in an electronically encrypted and transmitted ZIP file that includes the identity of the private pay telephone vendor therein, or if the records come in via mail, the return address information may be used in search fields or the like to rapidly find the private pay telephone vendor ID, in order to appropriately name the database so that it does not get confused with other private pay telephone vendors' databases. A first record is selected (by the parser 64) at step 1202, and a test is performed at step 1204 to determine whether the call for which the selected record is storing data was to a DAC destination, e.g., an "800," "888," "877," "950" or "1010" number or the like. If not, as determined by the Destination field in the record, step 1204 branches to steps 1212–1214 to look for another record and select the next one, if any.

If step 1204 determines that the call represented by the selected record was to a DAC destination, step 1204 branches to step 1206 to test whether the call was long enough to be considered completed, to a very-high probability. If the call was not long enough, step 1206 bypasses the adding of the record. If the call was long enough in duration (e.g., twenty seconds) as measured by the duration field, step 1206 branches to step 1208, where the ANI information may be modified as appropriate to adjust for splits. Splits occur when an area code (NPA) changes, which is publicly available information identifying the area code change and the date the change is first effective. If telephone vendors have not reprogrammed their ANIs to reflect a split, step 1208 appropriately adjusts the ANI information to be put in the DAC record. Then, at step 1210, selected fields (FIG. 6) of the call including the (possibly adjusted) ANI are added as a record to the DAC database 66. The process repeats via steps 1212–1214 until the available records are parsed in this manner, whereby the DAC database 66 is built with appropriate information. Note that the parsing of FIG. 12 may be performed by one or more simple SQL statements, however because files of SMDR records can contain more non-DAC calls then DAC calls, it is faster to evaluate the records in this manner. For those SMDR records that contain nothing but DAC records, a simple SQL statement or file input template may be used. Moreover, the file attributes (size, data types or structure) of the SMDR files may determine the best input method.

Figure 13:
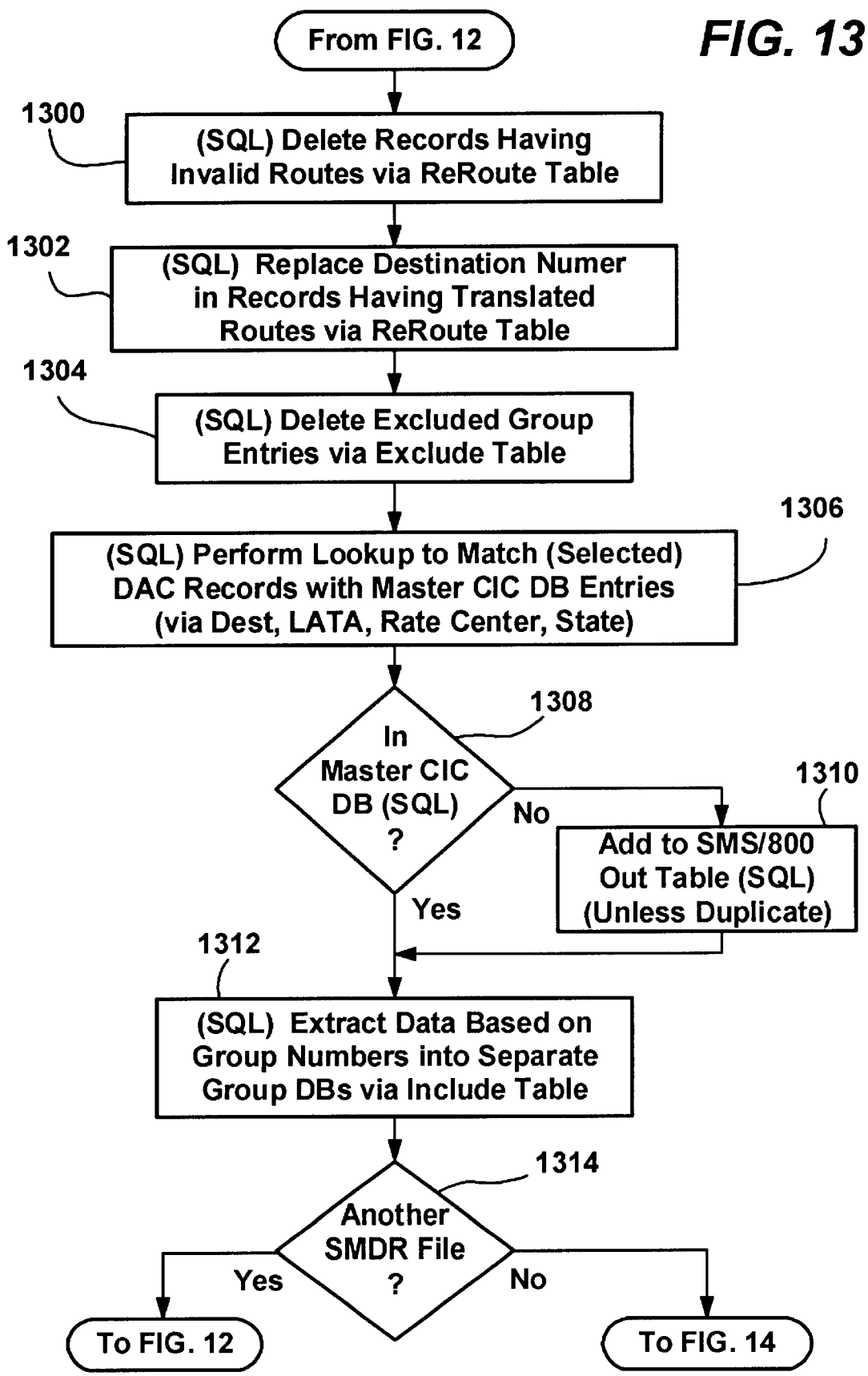
FIGS. 13–16 comprise a flow diagram generally representing the process for determining the CIC and CID codes for each DAC record to generate output therefrom in accordance with various aspects of the present invention.

Step 1300 of FIG. 13 represents the removal of records having invalid routes, performed by a SQL statement via the reroute table 69 (FIG. 4) such that records having invalid route translations are deleted. Then, step 1302 represents the replacing of the destination number in records having validly-translated routes according to the reroute table 69. Next, as represented by step 1304, the exclude table 70 (FIG. 4) is used in a SQL statement to delete records corresponding to excluded groups by an exclusion process 71.

At this time, selected records in the DAC database 66 are matched against the local master CIC database 84 to determine which CICS are needed. More particularly, the CIC locator 80 employs a SQL statement (logically shown via steps 1306–1310) that uses the NPA/NXX database 86 to find the LATA, Rate Center and State of the ANIs and the destination and date of the call to cross-reference with similar fields in the local master CIC database 84. The matching is limited to those destinations where the CIC is not already known from the destination, e.g., presently "800," "877" and 888 numbers, but not "950" and "1010" numbers. If no corresponding entry is found in the local master CIC database 84 for a given record in the DAC database 66, the LATA, Rate Center and State and the destination number and date are added to the SMS/800 out table 88, unless already present therein. Duplicate sets of information are not added, since the CIC information would be the same, however it is alternatively feasible to add duplicates and then eliminate them later. If instead the CIC was matched, the information is not added to the SMS/800 out table 88. Note that as an alternative to pruning the local master CIC database 84 of outdated entries, the local master CIC database 84 entry's date (not the call's date) may be used at this time as part of the SQL statement to add information to the out table for any expired CIC DB entries. However, it is more efficient to regularly (e.g., monthly) and separately prune the local master CIC database 84 of expired entries.

At this time, the include table 73 is used to divide the DAC database 66 into group databases, such as group databases per quarter. As described above, a process may first loop through the include table 73 to create any group databases that do not already exist. Then, using the include table 73, an extraction process 74 (FIG. 4) comprising a SQL statement adds the records to the appropriate databases based on the group field. For example, the DAC database 66 for private pay telephone vendor 30001 is converted to separate quarterly private pay telephone vendor 30002 and private pay telephone vendor 30003 databases, such as group databases $72_1$–$72_4$. Step 1312 of FIG. 13 represents this step. As described above, other time periods and criteria may be used when dividing up the DAC database. Indeed, for example, a private pay telephone vendor with no group distinctions that provides records quarterly will not have the DAC database divided, i.e., the DAC database will already be a group database for one quarter.

Step 1314 repeats this process for other files of SMDR records, starting with a new DAC database. Note that the existing out table 88 is maintained and added to, continuing to grow as needed to obtain missing information. Once there are no more records, the overall process continues to step 1400 of FIG. 14 to locate the missing CIC information (if any is needed).

Figure 14:
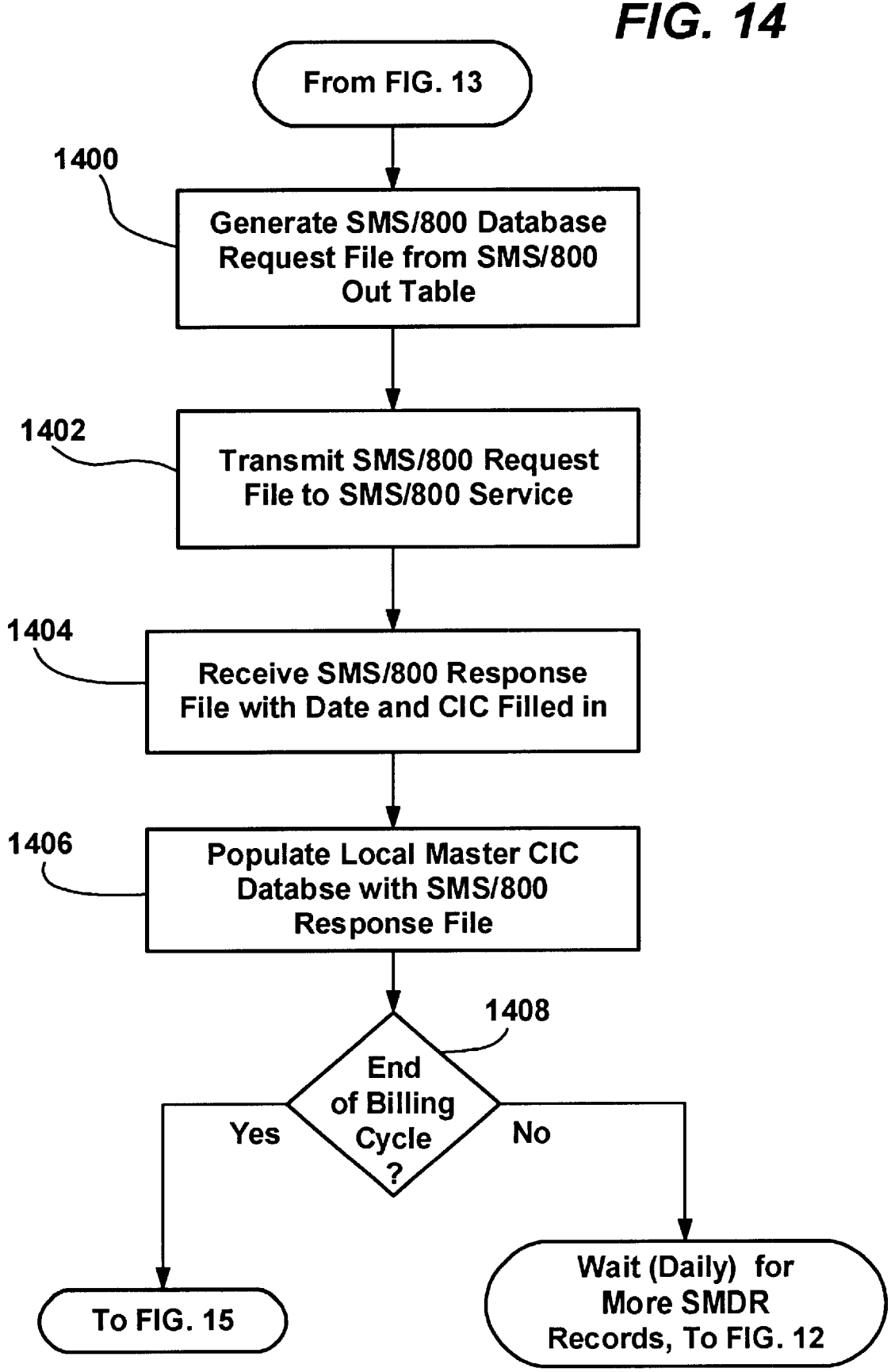

FIG. 14 represents the requesting of the CICs that were not found (or possibly were found but expired) in the master CIC database 84. To this end, if at least one entry is present in the SMS/800 out table 88, at step 1400 an SMS/800 request file 90 is generated from the SMS/800 out table 88, according to whatever format is required by the SMS/800 service, (e.g., a text file with some header information). Such formatting is straightforward and obtainable from the service, and is not described in detail herein. In any event, at step 1402 the SMS/800 request file 90 is transmitted to the service, and a response file 92 received therefrom (step 1404) providing a corresponding CIC for each requested rate center, LATA and state information of the ANI and the destination information and date of the call. At step 1406, the master CIC database 84 is updated with this information. Note that it is possible that some requests will return with an error instead of the CIC. If too many errors are located, (e.g., more than two percent), error-handling may be employed such as to re-try the request.

At this time, the master CIC database 84 is readied and the group databases are separated. If output (e.g., bill generation) is desired, then further action may be taken. For example, as represented by step 1408 in FIG. 14, further action in the form of output is taken at the completion of a billing cycle, presently quarterly. If no further action is desired at this time, the process delays as appropriate and returns to FIG. 12 to handle more incoming SMDR files as described above. For example, the delay essentially causes a once-per day handling of incoming SMDR files. The SMS/800 request file is sent at approximately the same time every day to help achieve some consistency.

Figure 15:
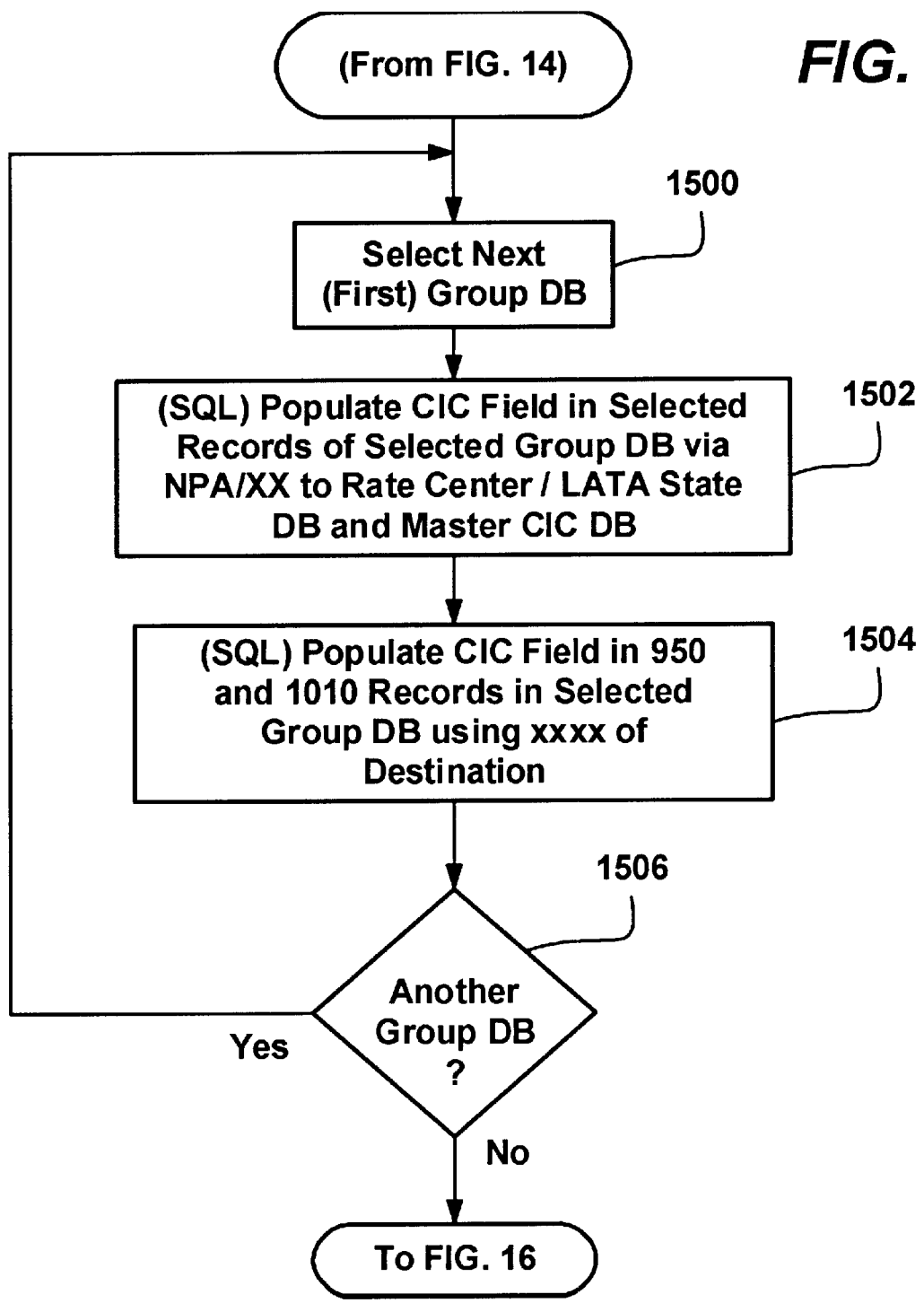
Figure 16:
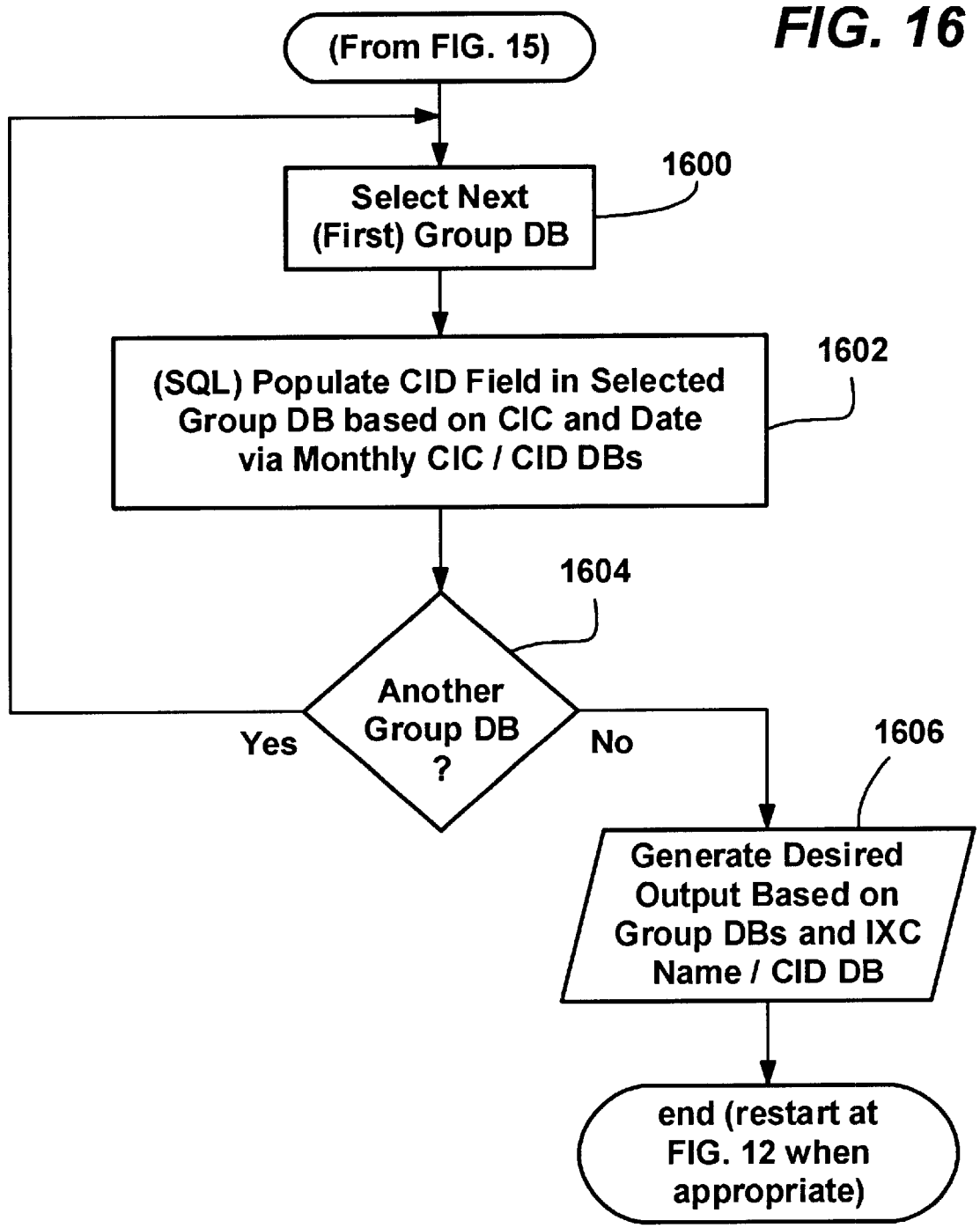

If the action is desired, e.g., in the present example a billing cycle has been achieved, then step 1408 continues to step 1500 of FIG. 15 where the CICs will be filled into the group databases. At step 1500, a group database is selected, and at step 1502 the CIC fields for selected records (i.e., those without CICs already in the destination, e.g., "800," "877," and "888" but not "950" and "1010" numbers) are filled in via the NPA/NXX to rate center, LATA, state database 86 and the master CIC DB 66. A SQL statement accesses both databases 84 and 86 to handle this operation based on the ANI, destination and date fields of selected group database records. Note that this information was either previously present or has been added via the SMS/800 response, but should be there for any given record. If for some reason the lookup produces a NULL result, (i.e., the SMS/800 response did not recognize the CIC), then the entry may be discarded. In the normal situation, the CIC code for the selected record will be filled into the blank CIC field of each record at step 1502.

For each record that already has the CIC as part of its destination, e.g, records of "950" and "1010" calls, the xxxx of the destination, which is the CIC, is copied via a SQL statement into the CIC field for each record at step 1504. Step 1506 repeats the CIC-filling process for any other group databases.

At this time, the CIC fields are filled in the group databases, however the CID fields, i.e., carrier identifier numbers that represent which entity presently owns which CICs, may not yet be known. To determine the CID fields, the CID locator process 106 selects a group (step 1600 of FIG. 16), and at step 1602, uses a SQL statement, the CICs and the appropriate monthly CIC/CID database based on the month of each call, to fill in the CID field for each record. Step 1604 repeats the process for the other group databases. When complete, step 1606 may be executed as desired on one or more of the group databases to generate desired output. Note that if a single database is used for all months, then the date is used as part of the SQL statement rather than to select which of the CIC-to-CID databases to query.

Figure 17:
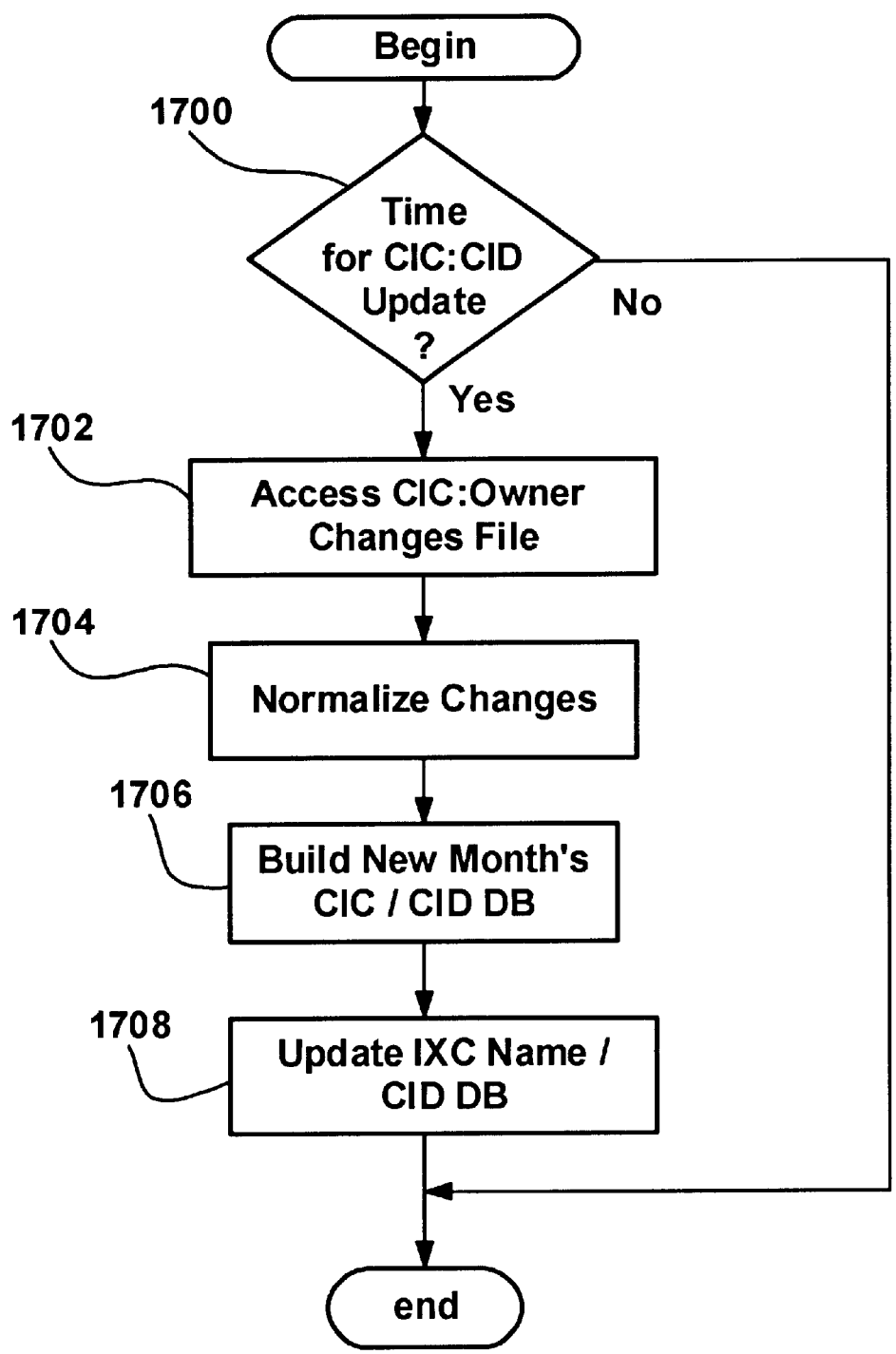
FIG. 17 is a flow diagram generally representing a process for updating databases when change information is available in accordance with one aspect of the present invention.

As mentioned above, a new CIC to CID database (e.g., 96$_2$) needs to be regularly built, and the IXC Name/CID database 104 regularly updated as changes come in as represented in FIG. 17. Note that the steps of FIG. 17 are typically done independent of the processing of the DAC records, e.g., as soon as the monthly changes become available. Generally, this is performed once per month, because the change file 94 is only updated on a monthly basis. As shown in FIG. 17, when it is time for an update, step 1702 is performed, which represents the accessing (e.g., downloading and opening) of the file, and step 1704 normalizes the information therein (as described above). At step 1706, the normalizer 98 builds a new month's CIC to CID database based on the previous month's data and the change information to enable cross-referencing of CIDs with their CICs on a given date. At step 1708, the normalizer process updates the IXC Name/CID database 100 so that the billing information (e.g., name, billing address and so forth) may be found from a given CID. As can be seen from the foregoing detailed description, there is provided a method and system that provide a compensation mechanism for pay telephone vendors to collect for dial around calls. The system and method enable the pay telephone vendors to reconcile the compensation based on information maintained at the pay telephone.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A method for determining compensation from telephone records of calls made, comprising:
   accessing the telephone records maintained at a telephone, and based on information in at least one of the records:
      locating a carrier identification code corresponding to a toll free call that was made, wherein the carrier identification code corresponding to the toll free call is not maintained at the telephone;
      establishing, independent of a telecommunications switch that was used to route the call, the owner of the carrier identification code when the toll free call was made, including accessing a database with date information and carrier identification code information corresponding to the call; and
      determining compensation owed by the owner of at least one carrier identification code.

2. The method of claim 1 further comprising, parsing the telephone records to eliminate records corresponding to calls that are not entitled to compensation.

3. The method of claim 2 wherein parsing the records to eliminate records corresponding to calls that are not entitled to compensation includes discarding records that do not correspond to toll free calls.

4. The method of claim 1 further comprising, filtering the telephone records to eliminate records not entitled to compensation.

5. The method of claim 4 wherein filtering the records to eliminate records not entitled to compensation includes eliminating records corresponding to calls less than a certain duration.

6. The method of claim 1 further comprising, detecting whether an actual number dialed with the call was translated to another number.

7. The method of claim 6 wherein the actual number dialed with the call was translated to another number, and further comprising, determining whether translation of the number was legal, and if not, determining that the record is not entitled to compensation.

8. The method of claim 1 further comprising, extracting certain records into groups based on information maintained in an include table.

9. The method of claim 1 further comprising, excluding certain records based on information maintained in an exclude table.

10. The method of claim 1 wherein locating a carrier identification code includes, accessing a database to determine whether a destination of the toll free call matches a destination of another call from having a previously located carrier identification code and that was made from a common originating rate center, LATA and state, and if so, using the previously located carrier identification code as the carrier identification code corresponding to the toll free call.

11. The method of claim 10 further comprising, determining the originating rate center, LATA and state based on an area code and prefix of the pay telephone.

12. The method of claim 1 wherein establishing the owner of the carrier identification code when each call was made further comprises, normalizing information in the database.

13. The method of claim 1 wherein establishing the owner of the carrier identification code when each call was made further comprises, constructing the database based on a previous database and changes made thereto.

14. The method of claim 1 further comprising, automatically generating a bill based on the compensation owed.

15. A computer-readable medium having computer-executable instructions for performing the method of claim 1.

16. A system in a computing device, comprising:
a set of telephone records obtained from a storage mechanism for at least one telephone, each record corresponding to a call made; and
for a toll free call that was made on a telephone, a mechanism that determines, independent of a telecommunications switch that was used to route the toll free call, an entity owing compensation for the toll free call based on the record corresponding to that call, including,
a first database access mechanism that queries a first database, via information from the record including destination information for the toll free call, to obtain carrier identification code information that is not stored at the telephone; and
a second database access mechanism that queries a second database, via the carrier identification code information from the first database and date information from the record, to identify the entity corresponding to the carrier identification code on the date the call was made.

17. The system of claim 16, further comprising a parser that eliminates records from the set that correspond to calls not entitled to compensation.

18. The system of claim 17, wherein the parser distinguishes between records corresponding to toll free calls and other records.

19. The system of claim 17 wherein the parser eliminates records corresponding to calls that were less than a certain duration.

20. The system of claim 16 further comprising a mechanism that eliminates records corresponding to calls that were less than a certain duration.

21. The system of claim 16, further comprising a separation mechanism configured to separate certain records based on a information maintained in a data structure.

22. The system of claim 21 wherein the separation mechanism comprises a filter that separates the records by eliminating selected records based on rerouting information in the data structure.

23. The system of claim 21 wherein the separation mechanism comprises an exclude process that separates the records by eliminating selected records based on information in the data structure.

24. The system of claim 21 wherein the separation mechanism comprises an include process that separates the records into distinct groups based on information in the data structure.

25. The system of claim 16 wherein the first database access mechanism locates the carrier identification code based on destination information that matches preserved destination information maintained for another call made from a common area code and prefix.

26. The system of claim 16 wherein the first database access mechanism locates the carrier identification code from a telecommunications naming service database.

27. The system of claim 16, further comprising, a normalizer configured to locate similar names to construct a new database of carrier identification codes to carrier identifiers based on a previous database and changes made thereto.

28. The system of claim 16 further comprising, a bill generator that generates a bill to the entity determined.

29. A computer-readable medium having stored thereon a data structure, comprising:
a destination field including destination data identifying a destination of a toll free telephone call;
a date field including date data identifying a date on which the toll free telephone call was made;
wherein the destination data and date data are obtained from a record maintained for a telephone and are independent of a telecommunications switch used to route the toll free telephone call;
a carrier identification code (CIC) field including CIC data identifying carrier information, wherein the CIC data is not maintained at the telephone and is obtained by accessing a CIC database based on the data in the destination field; and
a carrier identifier (CID) field including CID data identifying an entity that corresponds to the CIC data on the date the telephone call was made, wherein the CID data is obtained by accessing a database based on the CID data and the date data.

30. The data structure of claim 29 further comprising a group field including data indicating a group to which the data structure corresponds.

31. The data structure of claim 29 further comprising a duration field including data indicating a time duration of the telephone call.

32. The data structure of claim 29 further comprising a route field including data indicating routing information of the telephone call.

33. A computer-readable medium having stored thereon a data structure, comprising:
a destination field including destination data identifying a destination of a first toll free telephone call;
a source identifier field including data corresponding to a location from which the first toll free telephone call was made;
a carrier identification code field indicating a carrier identification code previously determined for the first toll free telephone call; and wherein when the carrier identification code for a second toll free call is needed, the data in the destination field and source identifier field for the first toll free call are compared against the destination data and source data of the second toll free call, and if corresponding, the carrier identification code for the second call is obtained from the carrier identification code field for the first toll free call.

34. The data structure of claim 33 wherein the source identifier field comprises a rate center field.

35. The data structure of claim 33 wherein the source identifier field comprises a LATA field.

36. The data structure of claim 33 wherein the source identifier field comprises a state field.

37. The data structure of claim 33 wherein the source identifier field comprises a rate center field, a LATA field and a state field.

38. The data structure of claim 33 further comprising, a date field including data representative of a time when the carrier identification code for the first toll free telephone call was determined.

39. The data structure of claim 38 wherein the data in the date field for the first call is checked to determine if the carrier identification code in the carrier identification code is current.

* * * * *